(12) United States Patent
Cormier et al.

(10) Patent No.: US 10,836,010 B2
(45) Date of Patent: Nov. 17, 2020

(54) COMPENSATING PAD

(71) Applicant: Satisloh AG, Baar (CH)

(72) Inventors: Alexandre Cormier, Dieppe (DE);
Simon Kleinagel, Hohenahr Altenkirchen (DE); Daniel Keiner, Huttenberg (DE)

(73) Assignee: SATISLOH AG, Baar (CH)

( * ) Notice: Subject to any disclaimer, the term of this patent is extended or adjusted under 35 U.S.C. 154(b) by 408 days.

(21) Appl. No.: 15/932,333

(22) Filed: Feb. 16, 2018

(65) Prior Publication Data

US 2018/0236625 A1    Aug. 23, 2018

(30) Foreign Application Priority Data

Feb. 17, 2017 (DE) .................. 10 2017 103 333

(51) Int. Cl.
| | | |
|---|---|---|
| *B24B 13/00* | (2006.01) | |
| *B24B 13/005* | (2006.01) | |
| *B24B 13/01* | (2006.01) | |
| *B24B 9/14* | (2006.01) | |
| *B29D 11/00* | (2006.01) | |

(52) U.S. Cl.
CPC ........ *B24B 13/0055* (2013.01); *B24B 13/005* (2013.01); *B24B 13/01* (2013.01); *B24B 9/14* (2013.01); *B29D 11/00942* (2013.01)

(58) Field of Classification Search
CPC ... B24B 13/0055; B24B 13/005; B24B 13/01; B24B 9/14; B29D 11/00942
USPC ........................... 451/5, 41, 42, 44, 384, 390
See application file for complete search history.

(56) References Cited

U.S. PATENT DOCUMENTS

| | | | |
|---|---|---|---|
| 3,490,182 A | 1/1970 | Lanman | |
| 3,594,963 A * | 7/1971 | Beasley | .................. B24B 13/01 |
| | | | 51/293 |
| 4,925,518 A | 5/1990 | Wasserman et al. | |
| 5,567,198 A | 10/1996 | Cook | |
| 6,074,290 A * | 6/2000 | Ko | ....................... B24B 13/0057 |
| | | | 451/390 |
| 7,128,638 B2 * | 10/2006 | Siders | ....................... B24B 1/00 |
| | | | 451/5 |
| 7,201,632 B2 * | 4/2007 | Elledge | .................. B24B 37/005 |
| | | | 451/10 |
| 10,092,990 B2 * | 10/2018 | Jung | ..................... B24B 13/005 |
| 2003/0190872 A1 | 10/2003 | Arai et al. | |
| 2007/0105490 A1 | 5/2007 | Achy et al. | |
| 2008/0274675 A1 | 11/2008 | Cole et al. | |
| 2012/0058712 A1 * | 3/2012 | Oliver | ..................... B24B 37/24 |
| | | | 451/41 |

FOREIGN PATENT DOCUMENTS

EP           2042265 B1    11/2011

* cited by examiner

*Primary Examiner* — George B Nguyen
(74) *Attorney, Agent, or Firm* — 24IP Law Group USA, PLLC; Timothy Dewitt (57) ABSTRACT

A compensating pad for applying to an ophthalmic lens blank to be blocked, or for interposing between an ophthalmic lens blank and a block piece. The compensating pad comprises a main body that is designed to be elastic having a maximum thickness corresponding to a maximum layer thickness difference of the ophthalmic lens blank, in order to locally compensate for the layer thickness difference of the blocked ophthalmic lens blank.

12 Claims, 6 Drawing Sheets

COMPENSATING PAD

CROSS-REFERENCE TO RELATED APPLICATION

This application claims priority of and benefit to the Patent Application DE 10 2017 103 333, filed 17 Feb. 2017. The entire content of the Patent Application DE 10 2017 103 333 is hereby incorporated by reference.

BACKGROUND OF THE INVENTION

Field of the Invention

The present invention essentially relates to a compensating pad for applying onto an ophthalmic lens blank to be blocked or for interposing between an ophthalmic lens blank and a block piece. The present invention further relates to a method for manufacturing ophthalmic lenses by applying the compensating pad to an ophthalmic lens blank to be blocked or for interposing the compensating pad between an ophthalmic lens blank and a block piece.

Brief Description of the Related Art

The invention relates to preventing or minimizing flawed ophthalmic lens effects that can occur due to mechanical stresses in ophthalmic lenses in the blocked state, which exclude these ophthalmic lenses from further use (exclusion according to DIN ISO 8980-1/2).

A "block piece" or block member (also referred to as "workpiece support block") is used to hold all ophthalmic lens blank or ophthalmic lens preform during the machining of the same, as is done in prescription laboratories or production facilities for manufacturing individual ophthalmic lenses from commercially available materials (mineral glass, polycarbonate, PMMA, CR 39, HI Index etc.).

The ophthalmic lens blank, which in top plan view is usually round or oval, substantially comprises a first surface with a predetermined curvature and a second surface, on which a desired surface contour is created by a mechanical process. The entire process is substantially referred to as lens surfacing to obtain a finished ophthalmic lens, such that the first surface curvature of the first surface and the second surface curvatures of the second surface interact to yield the desired optical characteristics. Usually, the ophthalmic lens blanks are prepared for block use before lens surfacing, namely by applying a suitable protective film or a suitable protective coating to protect the optically active surface, which has already been machined or shaped, i. e., the first surface or the surface to be blocked.

Thereupon the so-called "blocking" of the ophthalmic lens blank is carried out. To this end, the ophthalmic lens blank is connected with a suitable block piece or block member, for example according to the German standard DIN 58766. For this purpose, the block piece is first brought into a predefined position relative to the protected first surface of the ophthalmic lens blank and in this position the space between block piece and ophthalmic lens blank is then filled with a meltable material (usually a metallic alloy or wax) or an adhesive composition, which is curable, e. g. by UV or visible light. Once this block material is solidified or hardened the block piece forms a holder or support for machining the second surface of the ophthalmic lens blank. The block piece is grasped by a clamping device or other suitable coupling devices during ophthalmic lens processing to provide in particular for secure mounting on the profiling machine while avoiding damage to the ophthalmic lens.

Thereupon the surface of the ophthalmic lens blank is finished using profiling machines, which typically have a cutter of some type that is moved across the second surface of the ophthalmic lens blank to give the second surface of the ophthalmic lens blank its desired macro-geometry. The ophthalmic lens blank may remain stationary or may rotate during the cutting operation, depending on the profiling generator used. Typical machining processes for surfacing ophthalmic lenses include single-point diamond turning, diamond tool fly-cutting, single-tooth milling and grinding processes, which are applied depending on the lens material. After the precision machining and the polishing process, the ophthalmic lens blank is optionally cut to shape and, if necessary, one or more bevels or a groove may be introduced entirely or partially on the edge. Finally, the ophthalmic lens blank is separated from the block piece as a finished ophthalmic lens by so-called "unblocking" or "deblocking" to subsequently be further processed and/or fitted into the ophthalmic lens frame.

One disadvantage of the conventional overall process as outlined above consists in the fact that mechanical stresses may occur in the blocked ophthalmic lens blank during curing of the block material, due to the shrinkage behavior of the block materials used. In particular in ophthalmic lens blanks for bifocal ophthalmic lenses and trifocal ophthalmic lenses, as well as front surface progressive ophthalmic lenses, severe differences in surface characteristics of the first surface to be blocked (differences in the topography of the surface), i. e. the front surface of the ophthalmic lens blank, frequently occur. As a result, the blocked ophthalmic lens blanks transfer these differences in surface characteristics to the block materials used so that locally varying layer thicknesses in the block material can occur. Because of this, mechanical stresses occur in the blocked ophthalmic lens blank and the block material during curing of the block material. After unblocking or deblocking of the machined ophthalmic lens blank, the combination of the desired addition power of the curvature with the stiffness of the material of the ophthalmic lens blank, after eliminating the external force (i.e. when stress is released), results in local deformation of varying severity of the machined ophthalmic lens blank such that unintended power errors (e. g. cylinder and/or axis) are measurable in the machined ophthalmic lens blank, which are outside the permitted power tolerance ranges. In particular in bifocal ophthalmic lenses, a ripple is created after machining and unblocking or deblocking in the portion of the second segment edge on the back curvature, i. e. on the second surface that is not blocked (see FIG. 7F) that results in an undesirable bump (power bump) in the optical power.

A variety of block materials for the block piece are used for blocking the ophthalmic lens blank. The following block materials are known in the industry: low-melting wrought lead alloys, wax, thermoplastic materials as well as UV-curing adhesive materials. These block materials have differing degrees of shrinkage behavior. When using the most common alloys, a protective film is applied to the entire front surface of the ophthalmic lens blank, i.e. on the first surface to be blocked, as described in European Patent EP 2042265 B1. This protective film is applied manually or automatically and serves to protect the ophthalmic lens blank and to act as a bonding bridge to the block material of the block piece. The protective film is manually or automatically removed after machining. However, such a protective film, as described in European Patent EP 2042265

B1, does not compensate or, at least not sufficiently, for the locally varying layer thicknesses in the block material used.

It is thus the object of the present invention to take suitable measures when blocking ophthalmic lens blanks, or to provide suitable means for an ophthalmic lens blank, to prevent the undesirable power changes due to mechanical stresses induced by varying layer thicknesses of the block material in a blocked state of the ophthalmic lens blank.

SUMMARY OF THE INVENTION

The above object is solved by a compensating pad for applying onto an ophthalmic lens blank to be blocked or for interposing between an ophthalmic lens blank and a block piece, comprising a main body, designed to be elastic, having a maximum thickness corresponding to a maximum layer thickness difference of the ophthalmic lens blank in order to locally compensate for the layer thickness difference of the blocked ophthalmic lens blank. The above object is also solved by a compensating pad for applying onto an ophthalmic lens blank to be blocked, or for interposing between an ophthalmic lens blank and a block piece, comprising a main body that is designed to be elastic, abutting an portion directly adjacent to a segment edge of the blocked ophthalmic lens blank, to locally compensate for the layer thickness difference of the ophthalmic lens blank on the segment edge. In this way a reduction or neutralization of the layer thickness difference is achieved, thus resulting in a substantially uniformly thick block material layer so that the shrinkage behavior of the block material is approximately uniform or homogeneous. In particular, since the maximum thickness of the main body of the compensating pad corresponds to the maximum layer thickness difference of the ophthalmic lens blank, i.e, for example, the maximum segment height of a segment portion in a bifocal ophthalmic lens blank, the smallest cylinder error in the ophthalmic lens is thus achievable.

The compensating pad preferably is designed such that the main body is at least partially self-adhesive. As a result, the compensating pad does not shift on the front surface of the ophthalmic lens blank and remains securely adhered to the same during blocking and machining of the ophthalmic lens blank. The compensating pad is further preferably self-adhesive in such a way that it can be stripped off with the UV-adhesive during deblocking and no adhesive residues remain on the front surface of the ophthalmic lens blank.

The compensating pad preferably is designed such that the main body is made of a rubber-like material. The compensating pad preferably is designed such that the main body is fellable with a material that is different from the material of the main body, in particular with gel. Furthermore, the main body may also be made of a foam-like material, in particular from Sylodyn. In particular, the compensating pad is designed to be elastic. Due to the respective flexible materials, the resulting elastic compensating pad is thus able to conform to the different base curves of the front surface of the ophthalmic lens blank.

The compensating pad preferably is designed such that the main body has a shape that flattens out towards the edges, in particular a pillow-like shape. This way no new, additional edges are formed.

The compensating pad preferably is designed such that the main body is at least partially covered or enclosed by a covering film, or that a covering film is integrated with the main body, in particular the covering film is preferably transparent. An additional transparent covering film over the compensating pad helps to avoid new, additional edges and to continue to allow video detection of the segment edge of the ophthalmic lens blank. Additionally, a covering film on a compensating pad, which is adapted for so-called "flat-top" bifocal ophthalmic lenses, for example, may also be used for so-called "curved-top" bifocal ophthalmic lenses. Flat-top bifocal ophthalmic lenses have a straight segment edge, whereas curved-top bifocal ophthalmic lenses have a circular segmented, curved segment edge. By at least partially covering the main body of a compensating pad for a straight segment edge with a covering film, the resultant gap between the compensating pad and the circular segmented, curved segment edge may be covered or minimized.

The compensating pad is preferably designed such that the main body has a shape that is adapted to a bifocal segment of a blocked bifocal ophthalmic lens blank. In particular, the main body may have a shape that is adapted to a flat-top bifocal segment or to a curved-top bifocal segment of a blocked bifocal ophthalmic lens blank. The compensating pad is preferably designed such that the maximum thickness of the main body corresponds to about 0.3 mm to about 1.5 mm, preferably about 0.5 mm to about 0.8 mm, and the maximum width of the main body corresponds to about 28 mm to about 35 mm. However, the present invention is not limited thereto; the maximum width of the main body may correspond to up to about 45 mm, if necessary and/or desired. Thus, the compensating pad is appropriately adapted to the shape of standard segment ranges of bifocal ophthalmic lenses, in particular for FT28 and FT35, where "FT" refers to a flat-top bifocal segment with a straight segment edge having a width of the upper segment edge of about 28 mm and about 35 mm, respectively.

The compensating pad is preferably designed such that the main body has a disc shape that is adapted to the first surface (1) of the blocked bifocal ophthalmic lens blank (10). In particular, the main body has a disc shape corresponding to a three-quarter segment of a circle.

Furthermore, the above object is solved by a method for manufacturing ophthalmic lenses, in which a compensating pad for compensating for the varying layer thicknesses of the ophthalmic lens blank is applied such that at least part of the ophthalmic lens blank is covered.

In an exemplary method according to the invention, the compensating pad to be applied is preferably applied such that a surface with reduced surface differences, in particular a continuously derivable surface, for engaging a block piece is realized.

The compensating pad is preferably individually peeled from a roll. In this way the production process and the production effort can be minimized.

Additional effects and advantages of the compensating pad and the use of the compensating pad in a method for manufacturing ophthalmic lenses are evident to a person skilled in the art from the following description of the currently preferred embodiments of the invention.

BRIEF DESCRIPTION OF THE DRAWINGS

The invention will now be explained in more detail with reference to the following figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention. This invention becomes more obvious when reading the following detailed descriptions of some examples as part of the disclosure under consideration of the enclosed drawings. Referring now to the attached drawings which form a part of this disclosure.

DETAILED DESCRIPTION OF THE INVENTION

Preferred exemplary embodiments of the present invention are now described in more detail, with it being pointed out that the following description is provided only for illustrative purposes and not to limit the scope of protection to the illustrated and explained preferred embodiments of the invention. In particular, a person skilled in the art will understand that any individual feature which has been described in detail in relation to a preferred embodiment can also be used separately from these features in the same embodiment, or in combination with features of another embodiment. In addition, it should be understood that all given indications regarding material selection, size, dimension and the like are to be understood as examples only, and if any of them should prove to be an essential feature, this feature should be considered distinctive if used separately or in conjunction with other features described herein, regardless of whether such a combination of features is explicitly mentioned or is rather obtained by omitting one or more individual/isolated features from any described embodiment.

Figure 1A:
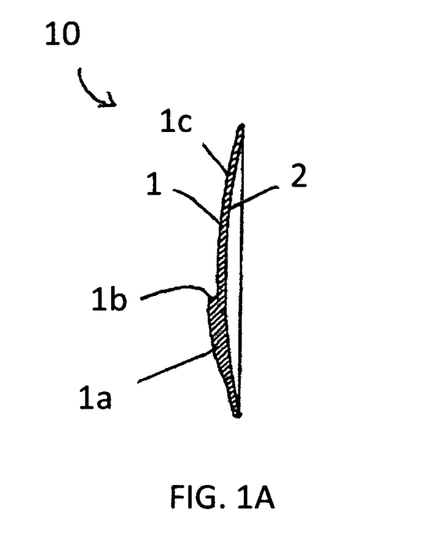
FIG. 1A shows a cross-sectional view of an exemplary bifocal ophthalmic lens blank.

FIG. 1A shows a cross-sectional view of an exemplary ophthalmic lens blank 10 or bifocal ophthalmic lens blank 10 in the use position, i.e., in the position in which the completed bifocal ophthalmic lens is installed in an ophthalmic lens frame. As can be seen in FIG. 1A, an ophthalmic lens blank 10 or bifocal ophthalmic lens blank 10 comprises a first surface 1 and a second surface 2 opposite first surface 1. First surface 1 corresponds to the front surface of bifocal ophthalmic lens blank 10. Second surface 2 corresponds to the back surface of bifocal ophthalmic lens blank 10. First surface 1 comprises a semi-circular segment portion 1a (also referred to as reading portion) having a higher glass thickness or layer thickness. First surface 1 further comprises a second segment portion 1c (also referred to as distance portion) having a lesser glass thickness or layer thickness than first semi-circular segment portion 1a. First segment portion 1a comprises a segment edge 1b at the transition portion to second segment portion 1c having the lower layer thickness of bifocal ophthalmic lens blank 10, as can be seen in FIG. 1A. Accordingly, bifocal ophthalmic lens blank 10 has a higher glass thickness or layer thickness at first segment portion 1a.

Figure 1B:
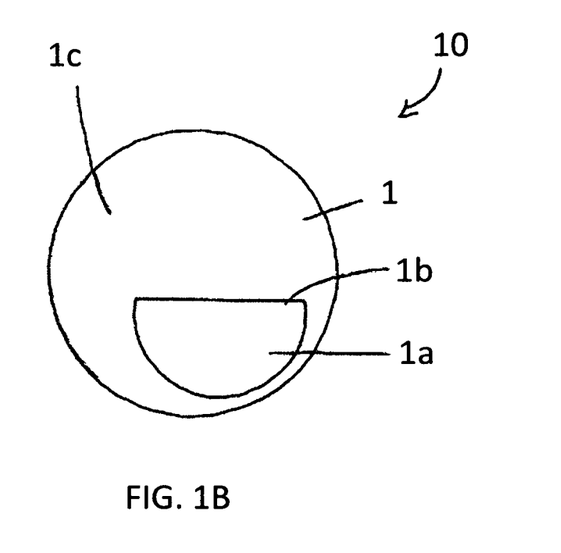
FIG. 1B shows a top plan view of the exemplary bifocal ophthalmic lens blank from FIG. 1A.
Figure 1C:
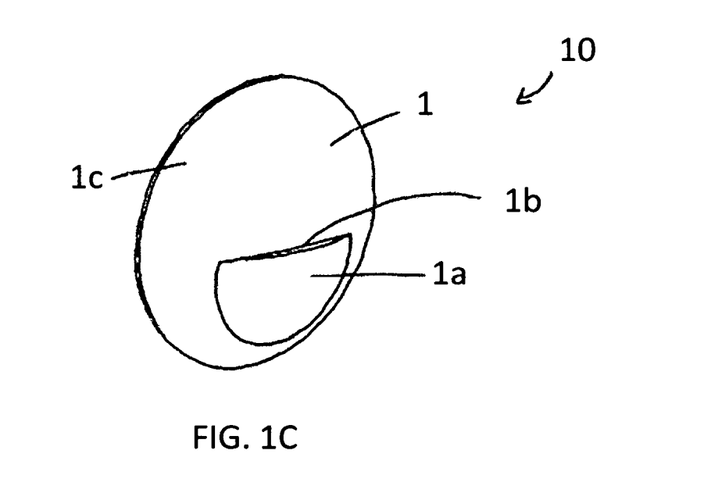
FIG. 1C shows a perspective view of the exemplary bifocal ophthalmic lens blank from FIG. 1A.

FIG. 1B shows a top plan view of exemplary bifocal ophthalmic lens blank 10 from FIG. 1A. As can be seen in FIG. 1B, first segment portion 1a has a straight segment edge 1b. In the present case, FIG. 1B shows a so-called flat-top bifocal ophthalmic lens blank 10 with a straight segment edge 1b. However, bifocal ophthalmic lens blanks with a curved segment edge, so-called curved-top bifocal ophthalmic lens blanks (not shown here), are also used herein. FIG. 1C shows a perspective view of exemplary bifocal ophthalmic lens blank 10 from FIG. 1A. As can be seen in FIG. 1C, segment edge 1b has a particular length and a particular thickness. In particular, standard bifocal ophthalmic lenses, e. g. FT28 and FT35 ("FT" means flat-top bifocal segment), have a segment edge width of about 28 mm and 35 mm, respectively, and may have a segment edge thickness or height of segment edge 1b of up to about 1 mm.

Figure 2A:
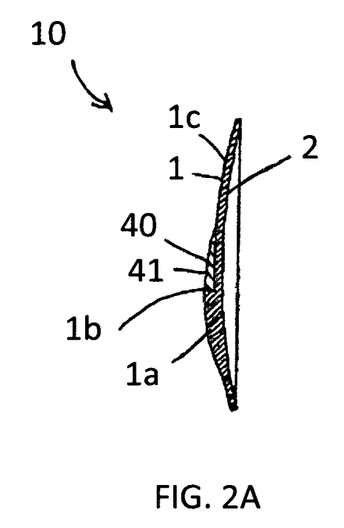
FIG. 2A shows a cross-sectional view of the exemplary bifocal ophthalmic lens blank with a compensating pad according to a first preferred embodiment.

FIG. 2A shows a cross-sectional view of an exemplary ophthalmic lens blank 10 in the use position, i.e. in the position in which the completed bifocal ophthalmic lens is installed in an ophthalmic lens frame, including a compensating pad 40 according to a first preferred embodiment. As can be seen in FIG. 2A, a compensating pad 40 according to the first embodiment is applied to first surface 1, in particular to second segment portion 1c, of bifocal ophthalmic lens blank 10. Compensating pad 40 is located directly in front of segment edge 1b, i.e. compensating pad 40 rests on second segment portion 1c (i.e. the distance portion), and thus in the use position above first segment portion 1a. Compensating pad 40 is applied with an adhesive, for example. Compensating pad 40 comprises a main body 41, designed to be elastic, having a maximum thickness corresponding to a maximum layer thickness difference from first segment portion 1a to second segment portion 1c of bifocal ophthalmic lens blank 10. Main body 41 of compensating pad 40 abuts an portion directly adjacent to segment edge 1b of segment portion 1a of first surface 1 of bifocal ophthalmic lens blank 10, as can be seen in FIG. 2A.

Figure 2B:
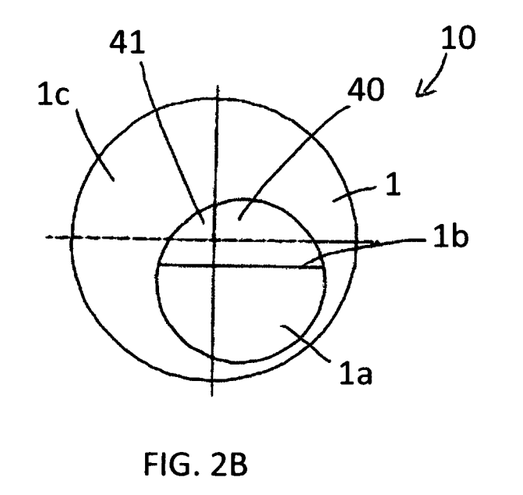
FIG. 2B shows a perspective view of the exemplary bifocal ophthalmic lens blank with the compensating pad from FIG. 2A.
Figure 2C:
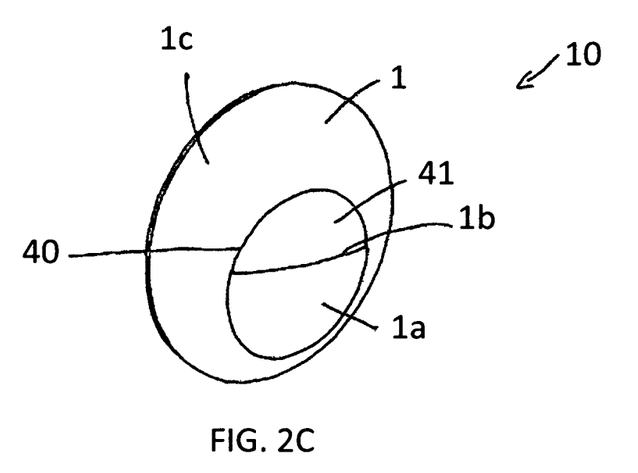
FIG. 2C shows a perspective view of the exemplary bifocal ophthalmic lens blank with the compensating pad from FIG. 2A.

FIG. 2B shows a top plan view of exemplary bifocal ophthalmic lens blank 10 with compensating pad 40 from FIG. 2A. FIG. 2C shows a perspective view of exemplary bifocal ophthalmic lens blank 10 with compensating pad 40 from FIG. 2A. As can be seen in FIGS. 2B and 2C, compensating pad 40 has a semi-circular shape. For example, compensating pad 40 is designed such that main body 41 is made of a rubber-like material, for example, to conform to segment portion 1a including segment edge 1b of first surface 1 of bifocal ophthalmic lens blank 10, as can be seen in FIGS. 2B and 2C. The rubber-like material of main body 41 of compensating pad 40 should have a certain flexibility/elasticity to conform over its entire surface to the "curved" geometry of surface 1, in particular second segment portion 1c, of ophthalmic lens blank 10 and thus also to be able to adhere thereto (adhesive property). However, the present invention is not limited to a rubber-like compensating pad 40. Compensating pad 40 could further be designed such that main body 41 is fillable with a material that is different from the material of main body 41, in particular with a gel, if desired and/or required. However, the present invention is not limited to this. Furthermore, main body 41 may also be made of a foam-like material, in particular from Sylodyn, for example, if desired and/or necessary.

Compensating pad 40 could further be designed such that, instead of a separate adhesive, main body 41 is at least partially self-adhesive, such that it can be stripped off again during later unblocking or deblocking of ophthalmic lens blank 10 with no adhesive residues remaining on first surface 1, in particular in second segment portion 1c and on segment edge 1b, of ophthalmic lens blank 10.

Compensating pad 40 may also be designed such that main body 41 has a shape that flattens out towards the edges, in particular a pillow-like shape. Furthermore, compensating pad 40, in particular main body 41, may be covered with an additional covering film (not shown) that is transparent. The covering film may be integrally formed as a unit with main body 41 of compensating pad 40. As another embodiment, compensating pad 40 may also be produced by an additive manufacturing method (3D printing).

Figure 3A:
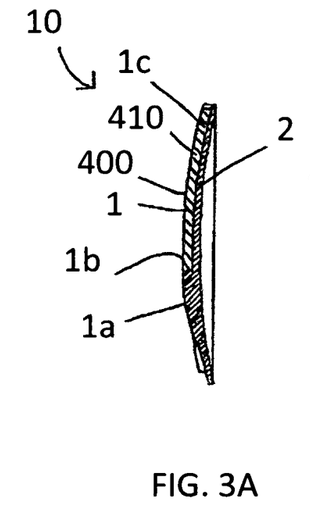
FIG. 3A shows a cross-sectional view of the exemplary bifocal ophthalmic lens blank with a compensating pad according to a second preferred embodiment.
Figure 3B:
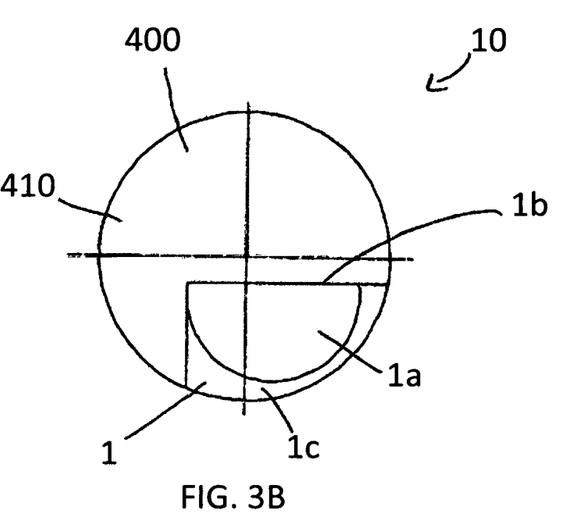
FIG. 3B shows a perspective view of the exemplary bifocal ophthalmic lens blank with the compensating pad from FIG. 3A.
Figure 3C:
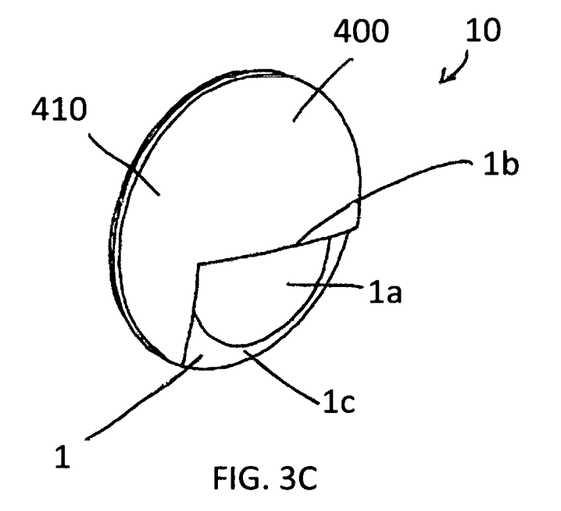
FIG. 3C shows a perspective view of the exemplary bifocal ophthalmic lens blank with the compensating pad from FIG. 3A.

FIG. 3A shows a cross-sectional view of the exemplary ophthalmic lens blank 10 or bifocal ophthalmic lens blank 10 in the use position, i.e. in the position in which the completed bifocal ophthalmic lens is installed in a lens frame, including a compensating pad 400 according to a second preferred embodiment. As can be seen in FIG. 3A, a compensating pad 400 according to the second embodiment is applied to first surface 1, in particular to second segment portion 1c, of bifocal ophthalmic lens blank 10. Compensating pad 400 is located directly in front of segment edge 1b, i.e. compensating pad 400 rests on second segment portion 1c (i.e. the distance portion). Compensating pad 400 is applied with an adhesive, for example. Compensating pad 400 comprises a main body 410, preferably formed as a circular disc, from which substantially a 90° segment has been removed, as can be seen in FIGS. 2B and 2C. The removed 90° segment of compensating pad 400 corresponds at least to first segment portion 1a of bifocal ophthalmic lens blank 10. The three-quarter circular segment of compensating pad 400 is arranged at segment edge 1b and thus extends almost completely over second segment portion 1c of first surface 1 of ophthalmic lens blank 10. Main body 410 has a thickness corresponding to at least the height of segment edge 1b of ophthalmic lens blank 10 or bifocal ophthalmic lens blank 10. Compensating pad 400 according to the second preferred embodiment can be produced easily and cost-effectively. Furthermore, compensating pad 400 according to the second embodiment can have all of the above features and functions of compensating pad 40 of the first embodiment, if necessary and/or desired.

Compensating pad 40 according to the first embodiment or compensating pad 400 according to the second embodiment is first applied to first surface 1 to be blocked, in particular to second segment portion 1c, of bifocal ophthalmic lens blank 10. Furthermore, bifocal ophthalmic lens blank 10 with compensating pad 40 or 400 is applied to block piece 30 via an adhesive 20. FIGS. 4A to 4E show the compensating pad 40 according to the first embodiment on blocked bifocal ophthalmic lens blank 10. FIGS. 5A to 5E show the compensating pad 400 according to the second embodiment on blocked bifocal ophthalmic lens blank 10.

Figures 4A, 4B:
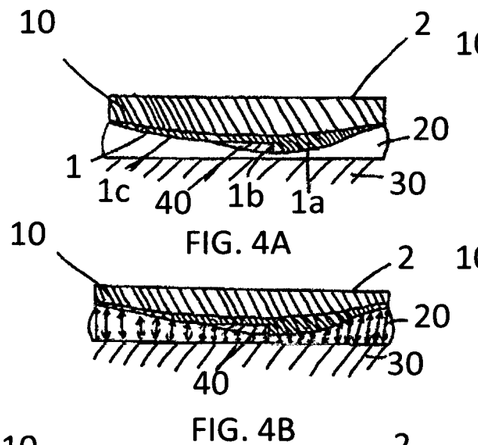
FIGS. 4A to 4E show the compensating pad according to the first embodiment from FIGS. 2A to 2C on a blocked bifocal ophthalmic lens blank.

As can be seen in FIGS. 2A and 4A, compensating pad 40 comprises a main body 41 designed to be elastic having a maximum thickness corresponding to a maximum layer thickness difference of first segment portion 1a and second segment portion 1c of bifocal ophthalmic lens blank 10 to locally compensate for the layer thickness difference of blocked bifocal ophthalmic lens blank 10 at segment edge 1b. Main body 41 of compensating pad 40 therein abuts an portion directly adjacent to segment edge 1b of first surface 1 of blocked bifocal ophthalmic lens blank 10 in order to locally compensate for the layer thickness difference of blocked bifocal ophthalmic lens blank 10 at segment edge 1b. Main body 41 of compensating pad 40 preferably has a thickness in the blocked state corresponding to that of segment edge 1b of first surface 1 to compensate for the layer thickness difference of bifocal ophthalmic lens blank 10 caused by segment edge 1b. Main body 41 of compensating pad 40 or 400 has a thickness of about 0.3 mm to about 1.5 mm, preferably about 0.5 mm to about 0.8 mm.

Figure 5A:
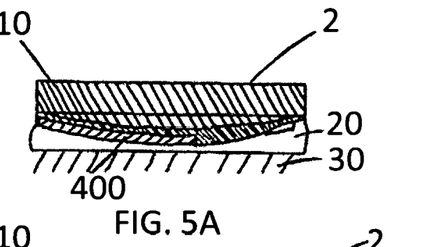
FIGS. 5A to 5E show the compensating pad according to the second embodiment from FIGS. 3A to 3C on a blocked bifocal ophthalmic lens blank.
Figure 5B:
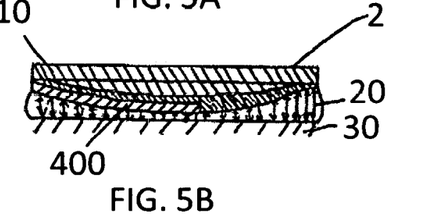

As is shown in FIGS. 4A and 5A, ophthalmic lens blank 10 or bifocal ophthalmic lens blank 10 with, for example, self-adhesive compensating pad 40 or 400 immediately abutting segment edge 1b is applied to block piece 30 via adhesive 20 to compensate for the varying layer thicknesses due to segment portion 1a of bifocal ophthalmic lens blank 10, such that a continuously derivable surface for engaging block piece 30 can be realized. The compensating pad 40 according to the first embodiment could further be designed such that main body 41 extends even further over second segment portion 1c of first surface 1 of bifocal ophthalmic lens blank 10, or even substantially completely covers the same, if necessary and/or desired.

Figure 4C:
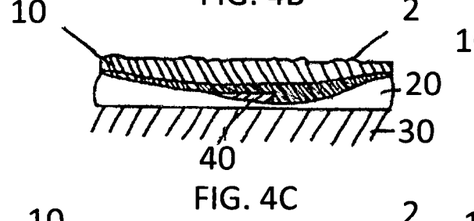
Figure 4D:
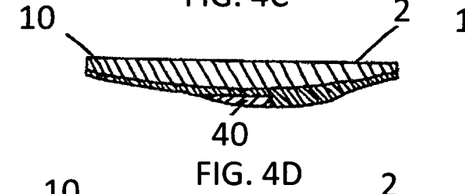
Figures 5C, 5D:
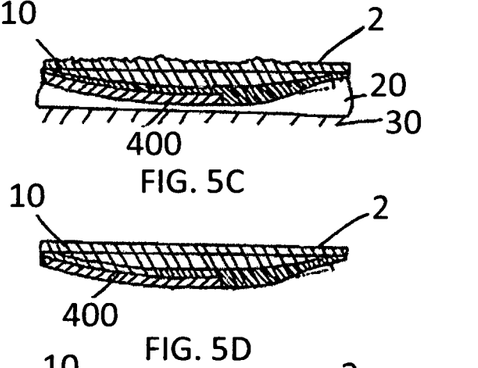

As can be seen in FIGS. 4A and 5A, when compensating pad 40 or 400 is applied to the first surface of ophthalmic lens blank 10 or of bifocal ophthalmic lens blank 10 and is blocked onto block piece 30 via adhesive 20, a uniform or homogeneous layer thickness of the adhesive material of adhesive 20 and of the block material of block piece 30 is created. In this uniform or homogeneous layer thickness, there is, due to the compensating pad used, no significant build-up of stress or pressure during curing in adhesive 20, which is usually induced by varying layer thicknesses in the adhesive material when the compensating pad according to the invention is not used. Second surface 2 of bifocal ophthalmic lens blank 10, namely the back side of bifocal ophthalmic lens blank 10, is machined as soon as compensating pad 40 or 400 and adhesive 20 are solidified or hardened on block piece 30, whereby block piece 30 forms a holder or support for machining second surface 2 of bifocal ophthalmic lens blank 10. As soon as second surface 2 of bifocal ophthalmic lens blank 10 is machined, the thickness of bifocal ophthalmic lens blank 10, in particular above segment portion 1a or segment edge 1b, is noticeably reduced and a rough surface is created on second surface 2 of bifocal ophthalmic lens blank 10 due to marks from machining (e. g., milling), as shown in FIGS. 4C and 5C. During the subsequent precision machining and polishing of machined surface 2 of bifocal ophthalmic lens blank 10, the rough surface created on surface 2 through machining is removed again, as shown in FIGS. 4D and 5D. Thus, the desired curvature on second surface 2 of bifocal ophthalmic lens blank 10 is achieved (so-called back curve).

Figure 4E:
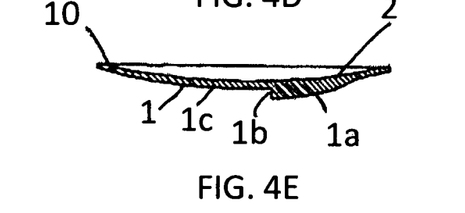
Figure 5E:
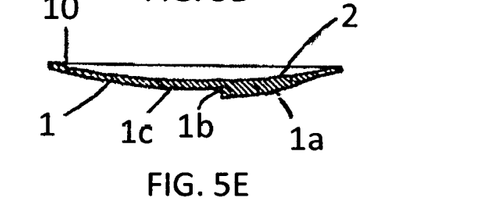

As shown in FIGS. 4E and 5E, after block piece 30, adhesive 20 and compensating pad 40 have been heated or softened, the finished ophthalmic lens blank 10 or bifocal ophthalmic lens blank 10 is separated from compensating pad 40 or 400, adhesive 20 and block piece 30, i.e. the so-called unblocking or deblocking of bifocal ophthalmic lens blank 10 takes place. After bifocal ophthalmic lens blank 10 has been unblocked or deblocked, machined second surface 2, due to the use of compensating pad 40 or 400, does not have any power errors, because a uniformly or homogeneously thick block material layer and adhesive material layer is created in the blocked state so that the shrinkage behavior of the block material is approximately uniform or homogeneous.

Figure 6:
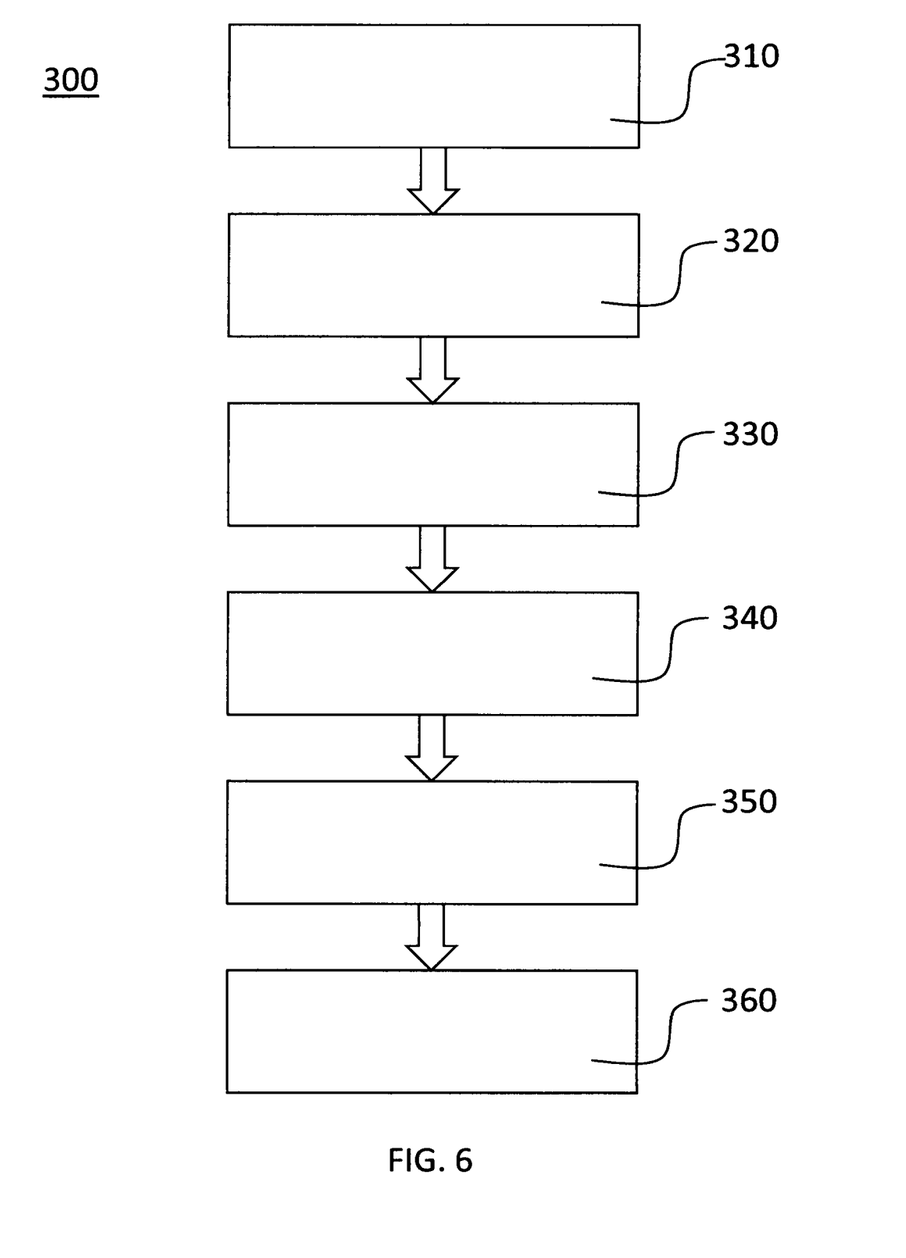
FIG. 6 shows a flow chart of a mechanical manufacturing process of an ophthalmic lens, in which the compensating pad according to the invention is used.

FIG. 6 shows a flow chart for the use of the compensating pad 40 or 400, as described above, in a method (300) for manufacturing ophthalmic lenses, in particular bifocal ophthalmic lenses.

The method substantially comprises the steps of: (310) providing an ophthalmic lens blank 10 with varying layer thicknesses, in particular a bifocal ophthalmic lens blank 10; (320) applying compensating pad 40, as described above, according to the first embodiment, or compensating pad 400 according to the second embodiment, in order to compensate for the varying layer thicknesses of ophthalmic lens blank 10 such that at least part of ophthalmic lens blank 10 is covered; (330) blocking ophthalmic lens blank 10; (340) machining blocked ophthalmic lens blank 10; (350) deblocking ophthalmic lens blank 10; and (360) separating compensating pad 40 or 400.

Furthermore, compensating pad 40 or 400 as described above may be applied to ophthalmic lens blank 10 such that a surface with reduced surface differences, in particular a continuously derivable surface for engaging with a block piece 30, may be realized. Compensating pad 40 or 400 may further be individually peeled from a roll, in particular a peel-off-roll device, ready for production purposes.

Figure 7A:
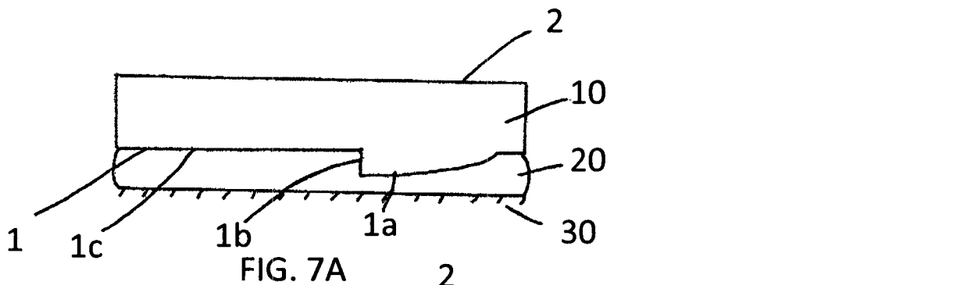
FIGS. 7A to 7F show by way of example the formation of an undesirable bump (so-called "power bump") on the machined back surface of the bifocal ophthalmic lens blank from FIGS. 1A to 1C; without the use of the compensating pad according to the invention.

FIGS. 7A to 7F illustrate by way of comparison or as a comparative example the creation of an undesirable power bump on bifocal ophthalmic lens blank 10, when compensating pad 40 or 400 according to the invention is not used. As shown in FIG. 7A, bifocal ophthalmic lens blank 10 is applied to a block piece 30 via an adhesive 20, for example an adhesive composition, or via a meltable material, metallic alloy or wax. Adhesive 20 is curable, e. g., by UV or visible light. Block piece 30 is, for example, made of various materials such as aluminum, stainless steel or plastic (e. g., PET). In the process, first surface 1 of bifocal ophthalmic lens blank 10, namely the front surface of the bifocal ophthalmic lens blank 10, is blocked onto block piece 30 via adhesive 20. First surface 1 of bifocal ophthalmic lens blank 10 already includes a prefabricated curvature (front curve). First surface 1 is also referred to as the surface to be blocked. Second surface 2 of bifocal ophthalmic lens blank 10 opposite first surface 1, namely the back side of bifocal ophthalmic lens blank 10, on the other hand is exposed and can be machined as soon as adhesive 20 is solidified or hardened, with block piece 30 forming a holder or support for machining second surface 2 of bifocal ophthalmic lens blank 10.

Figure 7B:
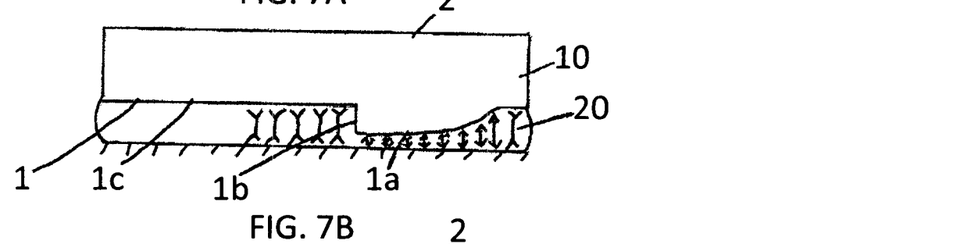
Figure 7C:
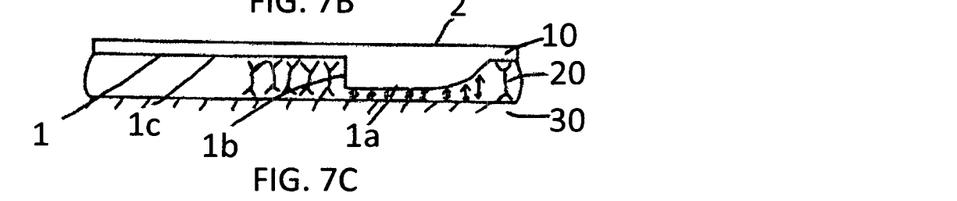
Figure 7D:
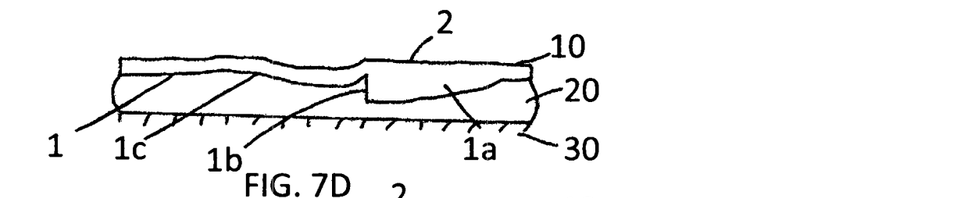
Figure 7E:
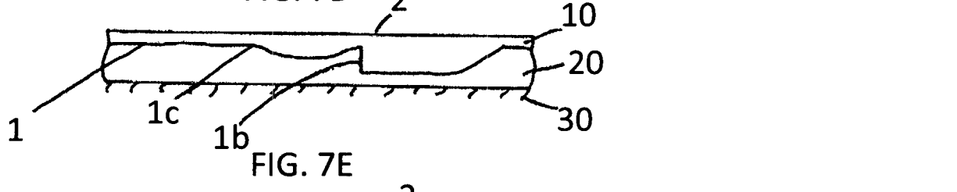

As schematically shown in FIG. 7B, significant stress and pressure build-up occurs in adhesive 20 during the hardening process, because due to its thickness and stiffness bifocal ophthalmic lens blank 10, which has not yet been machined, does not change its shape and thus substantially cannot absorb any stresses. As soon as second surface 2 of bifocal ophthalmic blank 10 is machined, the thickness of bifocal ophthalmic lens blank 10 is noticeably reduced, in particular above the transition from second segment portion 1c to segment edge 1b, and first and second surfaces 1, 2 of bifocal ophthalmic lens blank 10 are deformed due to the high stress loads in particular above segment edge 1b, as can be seen in FIGS. 7C and 7D, because the bifocal ophthalmic lens blank 10 can now absorb these stresses. During the subsequent precision machining and polishing of machined second surface 2 of bifocal ophthalmic lens blank 10, the deformations or "bulges" occurring during machining due to the stresses in the block material are removed again from second surface 2, as can be seen in FIG. 7E. Thus, the desired curvature on second surface 2 of bifocal ophthalmic lens blank 10 is achieved (so-called back curve).

Figure 7F:
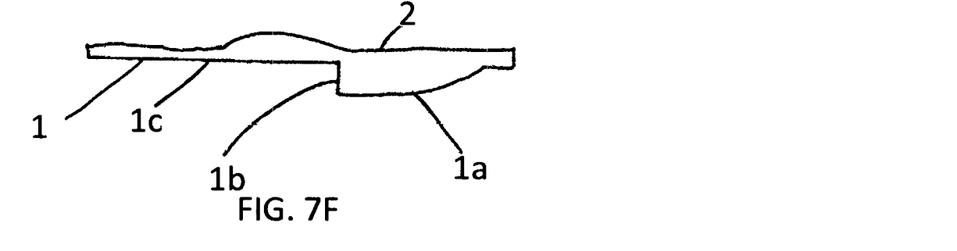

As can be seen in FIG. 7F, after block piece 30 and adhesive 20 have been heated or softened, finished bifocal ophthalmic lens blank 10 is separated from adhesive 20 and block piece 30, i.e. the so-called unblocking or deblocking of finished bifocal ophthalmic lens blank 10 takes place. After bifocal ophthalmic lens blank 10 is unblocked or deblocked, the deformations on first surface 1 resulting from blocking with varying thickness levels of adhesive 20 regress and first surface 1, in particular in second segment portion 1c or above segment edge 1b, corresponds again to the original prefabricated front-side curvature. However, as can be seen in FIG. 7F, after unblocking or deblocking, namely after eliminating the external force (i.e. when stress is released), the interplay of the front-side curve of surface 1, the back-side curve of second surface 2 and the stiffness of the material of bifocal ophthalmic lens blank 10 causes a ripple to be created in the portion above segment edge 1b on the back-side curve of surface 2, which results in an undesirable bump (a so-called "power bump") in the optical power. This undesirable bump can be measured as a power error (e. g., cylinder and/or axis) in finished bifocal ophthalmic lens blank 10, for example, by a so-called Lens-Mapper from the Belgian company A&R. This power error is outside of the permitted power tolerance ranges (exclusion according to DIN ISO 8980-1/2) and the affected ophthalmic lenses can no longer be used.

In summary, it can be said that the invention for the first time provides a compensating pad 40 or 400 to reduce or eliminate layer thickness differences so that the shrinkage behavior of the block material in all portions of the front surface of the ophthalmic lens blank is approximately uniform or homogeneous and thus the stress power on (or stress transfer to) the machined ophthalmic lens is minimized.

From the above description of the present invention, those skilled in the art will perceive improvements, changes, and modifications on the present invention. Such improvements, changes, and modifications within the skill in the art are intended to be covered by the appended claims.

REFERENCE ITEM LIST

1 first surface
1a first segment portion
1b segment edge
1c second segment portion
2 second surface
10 bifocal ophthalmic lens blank
20 adhesive
30 block piece
40 compensating pad
41 main body 400 compensating pad
410 main body

What is claimed is:

1. A compensating pad for applying onto an ophthalmic lens blank to be blocked, or for interposing between an ophthalmic lens blank and a block piece comprising a main body that is designed to be elastic having a maximum thickness corresponding to a maximum layer thickness difference of the ophthalmic lens blank to locally compensate for the layer thickness difference of the blocked ophthalmic lens blank, wherein the main body has a disc shape adapted to a first surface of a blocked bifocal ophthalmic lens blank.

2. The compensating pad according to claim 1, in which the main body is at least partially self-adhesive.

3. The compensating pad according to claim 1, in which the main body is made of a rubber-like material.

4. The compensating pad according to claim 1, in which compensating pad is designed to be elastic in order to conform to the curvature of a first surface of the ophthalmic lens blank.

5. The compensating pad according to claim 1, in which the main body is made of a foam-like material, in particular from Sylodyn.

6. The compensating pad according to claim 1, in which the main body has a shape that flattens out towards the edges, in particular a pillow-like shape.

7. The compensating pad according to claim 1, in which the main body is fillable with a material that is different from the material of the main body, in particular with gel.

8. The compensating pad according to claim 1, in which the maximum thickness of the main body corresponds to about 0.3 mm to about 1.5 mm, preferably about 0.5 mm to about 0.8 mm.

9. The compensating pad according to claim 1, in which the main body is at least partially covered by a transparent covering film, or a covering film is integrated into the main body.

10. The compensating pad according to claim 1, in which the disc shape of the main body substantially corresponds to a three-quarter segment of a circle.

11. A compensating pad for applying onto an ophthalmic lens blank to be blocked, or for interposing between an ophthalmic lens blank and a block piece comprising a main body that is designed to be elastic abutting on an portion directly adjacent to a segment edge of the blocked ophthalmic lens blank to locally compensate for the layer thickness difference of the ophthalmic lens blank at the segment edge, wherein compensating pad is designed to be elastic in order to conform to the curvature of a first surface of the ophthalmic lens blank and the main body has a disc shape adapted to the first surface of the blocked bifocal ophthalmic lens blank.

12. The compensating pad according to claim 11, in which the disc shape of the main body substantially corresponds to a three-quarter segment of a circle.

\* \* \* \* \*